United States Patent Office 3,769,353
Patented Oct. 30, 1973

3,769,353
PREPARATION OF PENTACHLOROPHENOL
James H. Francis, Belleville, and Linus H. Horcher, Columbia, Ill., assignors to Monsanto Company, St. Louis, Mo.
No Drawing. Continuation-in-part of application Ser. No. 694,098, Dec. 28, 1967. This application Aug. 25, 1970, Ser. No. 66,890
Int. Cl. C07c *39/36*
U.S. Cl. 260—623 H       4 Claims

ABSTRACT OF THE DISCLOSURE

The use of aluminum and copper as a catalyst in the chlorination of phenolic compounds to produce pentachlorophenol.

---

This application is a continuation-in-part of copending application Ser. No. 694,098 filed Dec. 28, 1967.

The preparation of pentachlorophenol, often known simply as "penta," by the direct chlorination of phenol has long been practiced by the art. The chemical literature discloses different methods for obtaining pentachlorophenol by using as catalysts: antimonous chloride, iron, aluminum trichloride, stannous chloride and cuprous chloride in quantities above 10%, with simultaneous heating of the employed substances. As a rule a long time has been required to obtain significant quantities of the main product. Furthermore, most commercial processes do not result in producing solely pentachlorophenol but actually a mixture of pentachlorophenol with slightly lower chlorinated phenols, for example, tetrachlorophenol, as well as some high boiling and some insoluble materials. Also the penta is usually dark in color. For the many applications of pentachlorophenol, for example, as a wood preservative, fungicide or insecticide, such a product may not be usable.

Thus, it is desirable that the "penta" be of a very high assay, at least about 90%, that it have a high crystallizing point, preferably about 180° C. or above, that the amount of alkali insoluble material be as low as possible and that it be quite light in color, preferably below a solution color in pine oil of about 3 on the NPA scale.

To a certain extent, however, the requirements mentioned above, that is, increased assay with minimal insoluble content and lowered color are very difficult to achieve since as chlorination is continued in an attempt to increase the penta content, color generally tends to increase and furthermore there is a concomitant increase in the amount of alkali insoluble material produced. Also, as the degree of chlorination is increased, it becomes exceedingly more difficult to control the reaction and over-chlorination can easily result, giving rise to not only off-specification material but also causing a reduction in the crystallization point.

Accordingly, it is an object of this invention to provide an improved process for producing pentachlorophenol. An additional object of this invention is to provide an improved process for the production of pentachlorophenol having a high assay of penta while at the same time having good color, that is, a color of about 3 or less on the NPA scale, which penta also has reduced amounts of alkali insoluble material present. It is an additional object of this invention to achieve the foregoing in cycle times shorter than those previously experienced in the art.

The foregoing objects and others are accomplished according to the present invention by conducting the chlorination of a phenol in the presence of a catalyst combination consisting of aluminum and copper. Preferably, the aluminum and copper are used in a form suitable for easy handling such as, for example, in the form of foil or granules or porous chips, although powdered forms are acceptable. Preferably the form chosen will have a bulk density slightly lower than the bulk density of the reaction mass, making it easy to maintain the catalyst in suspension. The amounts of aluminum and copper which are used are in the range of what is generally considered to be catalytic amounts, that is, the aluminum is present in the range of about 0.05 parts to about 0.25 parts per 100 parts of phenol charged (or the phenol equivalent in the case of starting materials other than phenol). Preferably the amount of aluminum is in the range of about 0.07 parts to about 0.09 parts per 100 parts of phenol charged. The amount of copper on the other hand need only be present in the range of about 0.005 parts to about 0.03 parts per 100 parts of phenol charged. Preferably copper is charged in the range of from a trace to in the range of about 0.005 to about 0.03 parts per 100 parts of phenol. Also, while the relative amounts of aluminum to copper can be varied, it is preferred to use an aluminum to copper ratio of about 2:1 to 4:1, respectively. While aluminum chloride can be used in lieu of aluminum as described above with the amount charged being equivalent in aluminum content to the amounts of aluminum noted above, for ease of handling as well as being able to obtain the full advantages of the invention, aluminum metal is preferred.

While it is common practice to prepare pentachlorophenol by the chlorination of phenol, it is not unusual for other starting materials either alone or in conjunction with phenol to be used. For example, suitable starting materials include the various chlorophenols having from 1 to 4 chlorine atoms and mixtures thereof as well as mixtures of one or more such chlorophenols with phenol. Preferred starting materials in addition to phenol include the monochlorophenols, e.g., p-chlorophenol and the dichlorophenols, e.g., 2,4-dichlorophenol.

The production of pentachlorophenol is based on the chlorination of phenol at a temperature between 65° and 200° C., preferably a maximum of 190° C., in the presence of the described catalysts. The process consists in a successive replacement of five hydrogen atoms combined with the five carbon atoms of the benzene ring by five chlorine atoms.

When preparing penta, the catalyst may be added at the beginning of the reaction, subsequently chlorine is introduced until an increase in weight is obtained corresponding to the addition of five atoms of chlorine for five atoms of hydrogen in a single phenol molecule. Phenol or other suitable raw material can also be first chlorinated without any catalyst until the increase in weight corresponds to the introduction of about two chlorine atoms in a single phenol molecule. The catalyst is added thereupon and the chlorination continues until the increase in weight corresponds to the introduction of five chlorine atoms into a single phenol molecule. The catalyst can also be added in increments.

The following examples will further illustrate the practice of the present invention.

EXAMPLE 1

Into a 2-liter, glass-lined reactor fitted with temperature measuring means, bottom discharge means, heating and cooling means, vapor discharge means and means for the subsurface addition of chlorine there was charged about 500 parts by weight of phenol. Chlorine was then fed to the phenol by subsurface addition through a ring sparger. The temperature of the phenol was maintained at about 100° until the reaction with the chlorine commenced, at which time heat was discontinued since the reaction was sufficiently exothermic to maintain the fluidity of the reaction mass. Chlorination was continued until the specific gravity of the reaction mass was about 1.45 at 90/15.5° C. at which time 1.75 parts by weight of porous aluminum and about 0.44 part of copper granules were charged. The temperature of the reaction mass was then raised about 20° C. and chlorination was continued until a specific gravity of about 1.650 at 90/15.5° C. was reached. At this point the progress of the reaction was monitored by gas liquid chromatography until the desired assay was reached. The total time to complete the reaction was approximately 7¼ hours. The reaction mass at this point was a dark color but upon steaming for about 5 minutes the color improved to a light orange. Upon analysis, the final reaction mass before steaming was found to contain about 92% pentachlorophenol and 0.24% alkali insoluble material and had a solution color of 2¼ NPA. After steaming the assay remained the same, the alkali insoluble material increased to 0.33% and the NPA color (in pine oil) was 1½.

EXAMPLE 2

Example 1 was repeated to give a product assaying about 90% pentachlorophenol. After steaming, the amount of alkali insoluble material was 0.17% and the NPA color was 2.

EXAMPLE 3

Example 1 was repeated except that the total reaction time was extended to 9 hours. This did not significantly alter the final assay of material, although a slight increase in color was noted.

EXAMPLE 4

Example 1 was repeated except that in place of phenol a mixed monochlorophenol was used with the product and yield being substantially the same as in Example 1.

EXAMPLE 5

Example 1 was repeated except that in place of phenol 2,4-dichlorophenol was used with the product and yield being substantially the same as in Example 1.

quality while giving rise to high yields of the desired

In some cases where the starting phenol is of poor quality containing minimal amounts of insoluble materials, it has been found that the color of the pentachlorophenol is sometimes above the desired color of about 3 NPA. In such instances it has been discovered that such off-color pentachlorophenol can be lightened in color considerably without a significant decrease in the assay or increase in insoluble material by a short steaming operation, that is, an operation in which the pentachlorophenol is intimately contacted with steam for from 1 to 30 minutes. Generally 1 to 10 minutes is sufficient. Such contacting can be effected by means known to those skilled in the art as for example by the subsurface addition of steam through an open pipe or through a commercially available sparging ring or other suitable types of gas-liquid contacting equipment. Alternatively small amounts, e.g., 0.001% to about 1% by weight, of an alkanol of 1 to 10 carbons, e.g., ethyl alcohol of isopropyl alcohol, can be added to improve the color of the penta.

While this invention has been described with respect to various specific examples and embodiments, it is to be understood that the invention is not limited thereto and that it can be variously practiced within the scope of the following claims.

The embodiments of this invention in which an exclusive property or privilege is claimed are defined as follows:

1. In a process for the preparation of pentachlorophenol by the reaction of chlorine with a phenolic compound selected from the group consisting of (a) phenol, (b) chlorinated phenol having from 1 to 4 chlorines and (c) mixtures of (a) and (b) at from about 65° C. to about 200° C., the improvement comprising conducting the reaction in the presence of aluminum and cooper, said aluminum being present in an amount of from about 0.05 part to about 0.25 part per hundred parts of phenol charged, said copper being present in an amount of from about 0.005 part to about 0.3 part per hundred part of phenol charged, and said aluminum and copper being present in weight ratio of aluminum to copper of from about 1.6:1 to about 50:1.

2. In the process of claim 1 where the aluminum and copper are present in a weight ratio of from about 2:1 to 4:1, respectively.

3. In the process of claim 2 where the phenolic compound is phenol.

4. In the process of claim 3 where the temperature during chlorination is from about 65° C. to about 200° C.

References Cited

UNITED STATES PATENTS

| | | | |
|---|---|---|---|
| 2,131,259 | 9/1938 | Stoesser | 260—623 H |
| 2,941,790 | 8/1960 | Shelton et al. | 260—623 H |

BERNARD HELFIN, Primary Examiner

W. B. LONE, Assistant Examiner